(12) United States Patent
Shinohara

(10) Patent No.: US 7,815,325 B2
(45) Date of Patent: Oct. 19, 2010

(54) VEHICLE SIDE MIRROR

(75) Inventor: Teruaki Shinohara, Isehara (JP)

(73) Assignee: Ichikoh Industries, Ltd., Tokyo (JP)

( * ) Notice: Subject to any disclaimer, the term of this patent is extended or adjusted under 35 U.S.C. 154(b) by 184 days.

(21) Appl. No.: 12/142,298

(22) Filed: Jun. 19, 2008

(65) Prior Publication Data
US 2008/0316627 A1 Dec. 25, 2008

(30) Foreign Application Priority Data
Jun. 25, 2007 (JP) ............................. 2007-166547

(51) Int. Cl.
G02B 7/182 (2006.01)
(52) U.S. Cl. ..................................... 359/871
(58) Field of Classification Search ................. 359/511, 359/871
See application file for complete search history.

(56) References Cited

U.S. PATENT DOCUMENTS 6,250,783 B1   6/2001   Stidham et al.

7,104,662 B2 *  9/2006   Kawanishi .................. 359/871

FOREIGN PATENT DOCUMENTS

JP         2004-196298 A      7/2004

* cited by examiner

*Primary Examiner*—Euncha P Cherry
(74) *Attorney, Agent, or Firm*—Foley & Lardner LLP

(57) ABSTRACT

A vehicle side mirror includes: a housing attached to a vehicle and holding a mirror; and a cover member being attachable to the housing, the cover member and the housing forming an integral outer shape of the vehicle side mirror when the cover member is appropriately attached to the housing. The cover member includes a cover-side identification part, and the housing includes a housing-side identification part which allows the cover member being paired with the housing to be appropriately attached to the housing, and which prevents the cover member not being paired with the housing from being appropriately attached to the housing, in cooperation with the cover-side identification part.

10 Claims, 7 Drawing Sheets

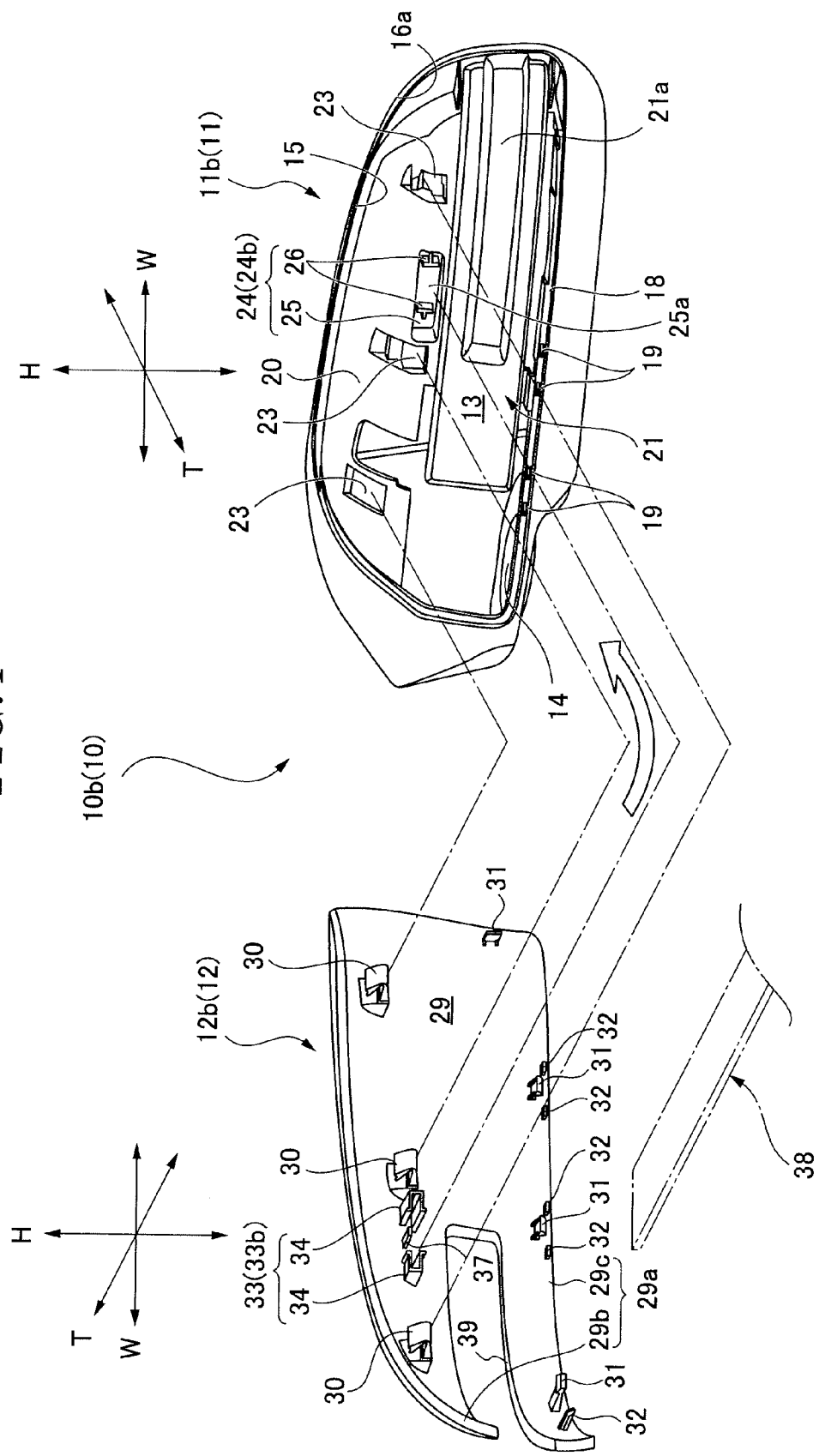

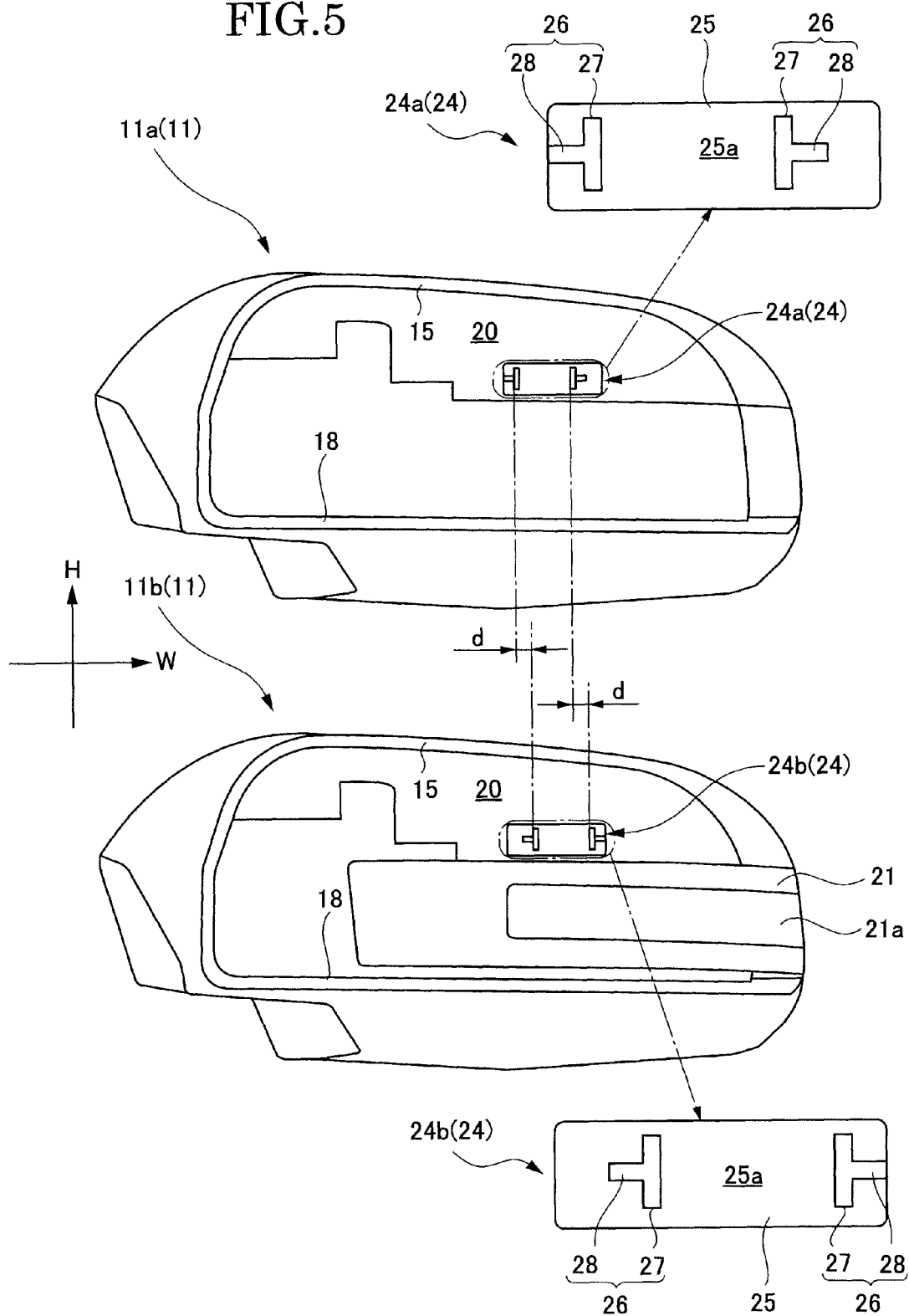

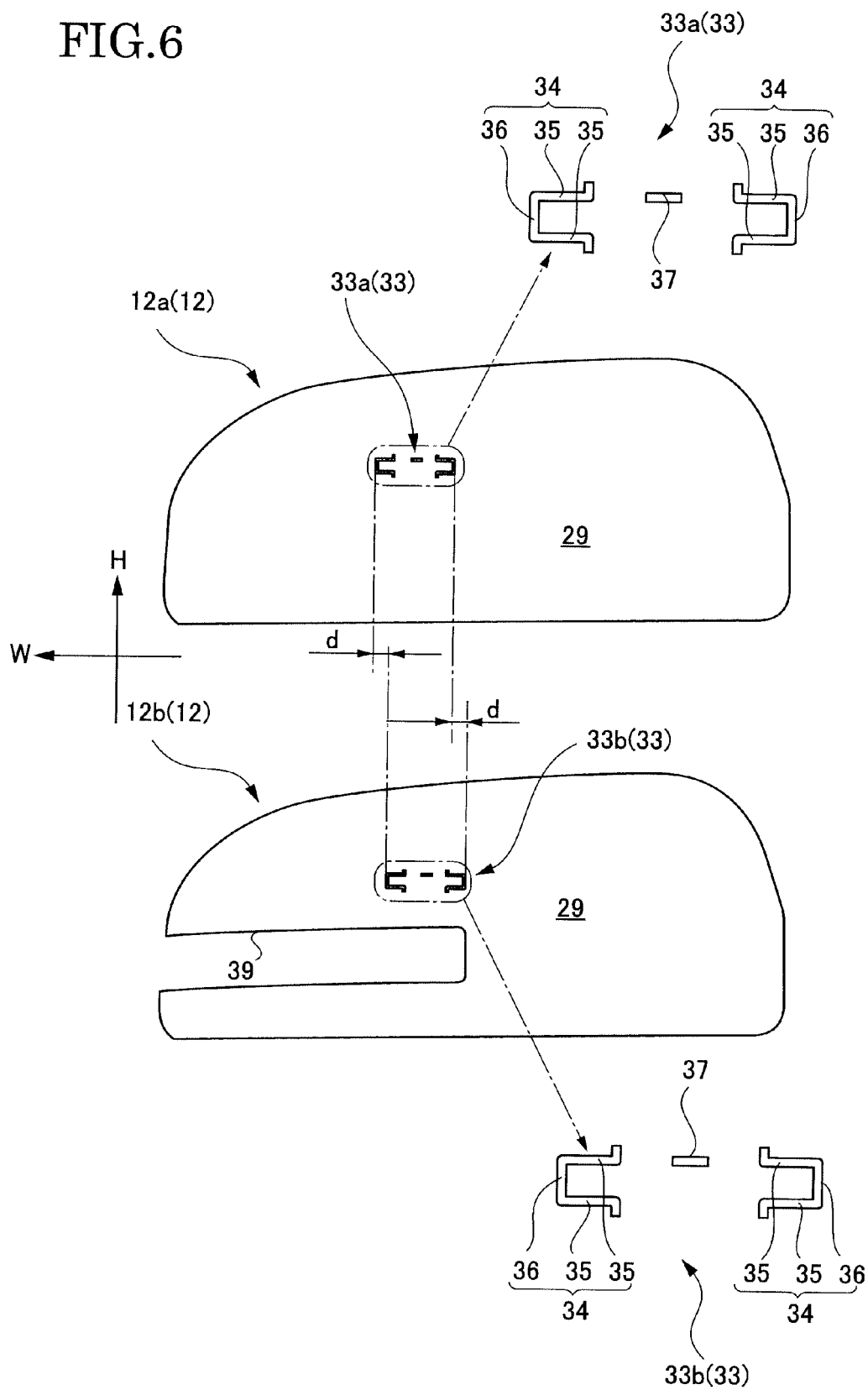

VEHICLE SIDE MIRROR

CROSS REFERENCE TO RELATED APPLICATIONS

The present application is based on and claims priority from Japanese Patent Application No. 2007-166547, filed Jun. 25, 2007, the disclosure of which is hereby incorporated by reference herein in its entirety.

BACKGROUND

The present invention relates to a vehicle side mirror mounted on each of both sides of a vehicle to be used when a driver checks behind the vehicle.

A vehicle side mirror is mounted on each of both sides of a vehicle to be used when a driver checks behind the vehicle. There is a type of the vehicle side mirrors in which a cover member is attached to a housing, which is mounted on the vehicle and holds the mirror. An outer shape of this type of the vehicle side mirrors is formed integrally by the cover member and the housing. In this type of the vehicle side mirrors, a housing-side-facing surface edge portion of a housing-side facing surface on a side to which the cover member is attached, of the housing, and a cover-side facing-surface edge portion of a cover-side facing surface, on a side which is attached to the housing, of the cover member are shaped to be matched with each other. When the cover member is attached to the housing in such a manner that the housing-side facing-surface edge portion and the cover-side facing-surface edge portion are brought into contact with each other while coinciding with each other, the housing and the cover member are smoothly continued with each other at a boundary between the housing-side facing-surface edge portion and the cover-side facing-surface edge portion so as to form an integral outer shape by the housing and the cover member.

In the above-mentioned type of the vehicle side mirrors, it is sometimes required to form vehicle side mirrors with multiple specifications having partially different structures but maintaining an entirely uniform outer shape being set for the same vehicle model. Examples of such multiple specifications set for a vehicle side mirror for the same vehicle model include a specification having an auxiliary warning light such as a turn signal lamp, and a specification having no auxiliary warning light. In order to correspond to such multiple specifications, for example, Japanese Patent Application Publication No. 2004-196298 proposes the following vehicle side mirror. Specifically, two types of cover members are formed for the same housing: a first cover member provided with an installation part for an auxiliary warning light; and a second cover member provided with no installation part therefor, each of which cover members is appropriately attachable to the housing while having a cover-side facing-surface edge portion matched with a housing-side facing-surface edge portion of the housing. The first cover member or the second cover member is appropriately selected and attached to the housing. In this way, two types of vehicle side mirrors for two different specifications are separately formed as appropriately. This makes it possible to easily form, while suppressing the manufacturing costs, vehicle side mirrors of different specifications having an entirely uniform outer shape matching the same vehicle model, that is, the specification provided with an auxiliary warning light and the specification provided with no auxiliary warning light.

However, in the aforementioned vehicle side mirror, since any one of the first cover member and the second cover member is attachable to the same type of housing, the following risk may arise. Specifically, the cover member having a specification different from a desired specification may be attached to the housing, in other words in the aforementioned example, the first cover member or the second cover member is selected wrongly, so that a vehicle side mirror having a specification (combination) different from a desired specification is formed. This risk is increased in a case where a uniformed basic color is used for the housing while the cover member is made to be matched with a vehicle color, and plural types of cover members are prepared whose difference lies in only the color for different specifications. This is because that there is no difference in process, such as whether or not wiring for an auxiliary warning light exists, as in the case of the presence or absence of the auxiliary warning light, in the operation of attaching each cover member.

SUMMARY

At least one objective of the present invention is to provide a vehicle side mirror forming an outer shape which is uniformed by a housing and a cover member attached thereto while having plural specifications and being capable of preventing an erroneous formation having a specification (combination) different from a desired specification.

To achieve these and other advantages and in accordance with the purpose of the invention, as embodied and broadly described herein, the invention provides a vehicle side mirror, comprising: a housing attached to a vehicle and holding a mirror; and a cover member being attachable to the housing, the cover member and the housing forming an integral outer shape of the vehicle side mirror when the cover member is appropriately attached to the housing, wherein the cover member includes a cover-side identification part, and wherein the housing includes a housing-side identification part which allows the cover member being paired with the housing to be appropriately attached to the housing, and which prevents the cover member not being paired with the housing from being appropriately attached to the housing, in cooperation with the cover-side identification part.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the specification, serve to explain the principles of the invention.

FIGS. 2A and 2B are schematic perspective views each illustrating the vehicle side mirror with a different specification according to the embodiment of the present invention, in which FIG. 2A illustrates a first vehicle side mirror as a simple mirror and FIG. 2B is a second vehicle side mirror having an auxiliary warning light.

FIG. 4 is a schematic perspective view illustrating a second housing on right side and a second cover member on left side.

FIG. 5 is a schematic front view explaining a structural difference between the first housing and the second housing.

FIG. 6 is a schematic front view explaining a structural difference between the first cover member and the second cover member.

FIGS. 7A, 7B, 7C and 7D are explanatory views each in which, under a so-called appropriate condition that the housing-side facing-surface edge portion and the cover-side facing-surface edge portion are brought into contact with each other, while coinciding with each other, when the housing attempts to attach to the cover member, a positional relationship between the housing-side identification part and the cover-side identification part from a view-point in the attaching direction is illustrated in an upper portion of the figure and a schematic cross-sectional view taken along a line I-I illustrated therein is illustrated in a lower portion thereof, wherein FIG. 7A illustrates the first housing and the first cover member, FIG. 7B illustrates the first housing and the second cover member, FIG. 7C illustrates the second housing and the second cover member, and FIG. 7D illustrates the second housing and the first cover member, respectively.

DETAILED DESCRIPTION

Figure 1:
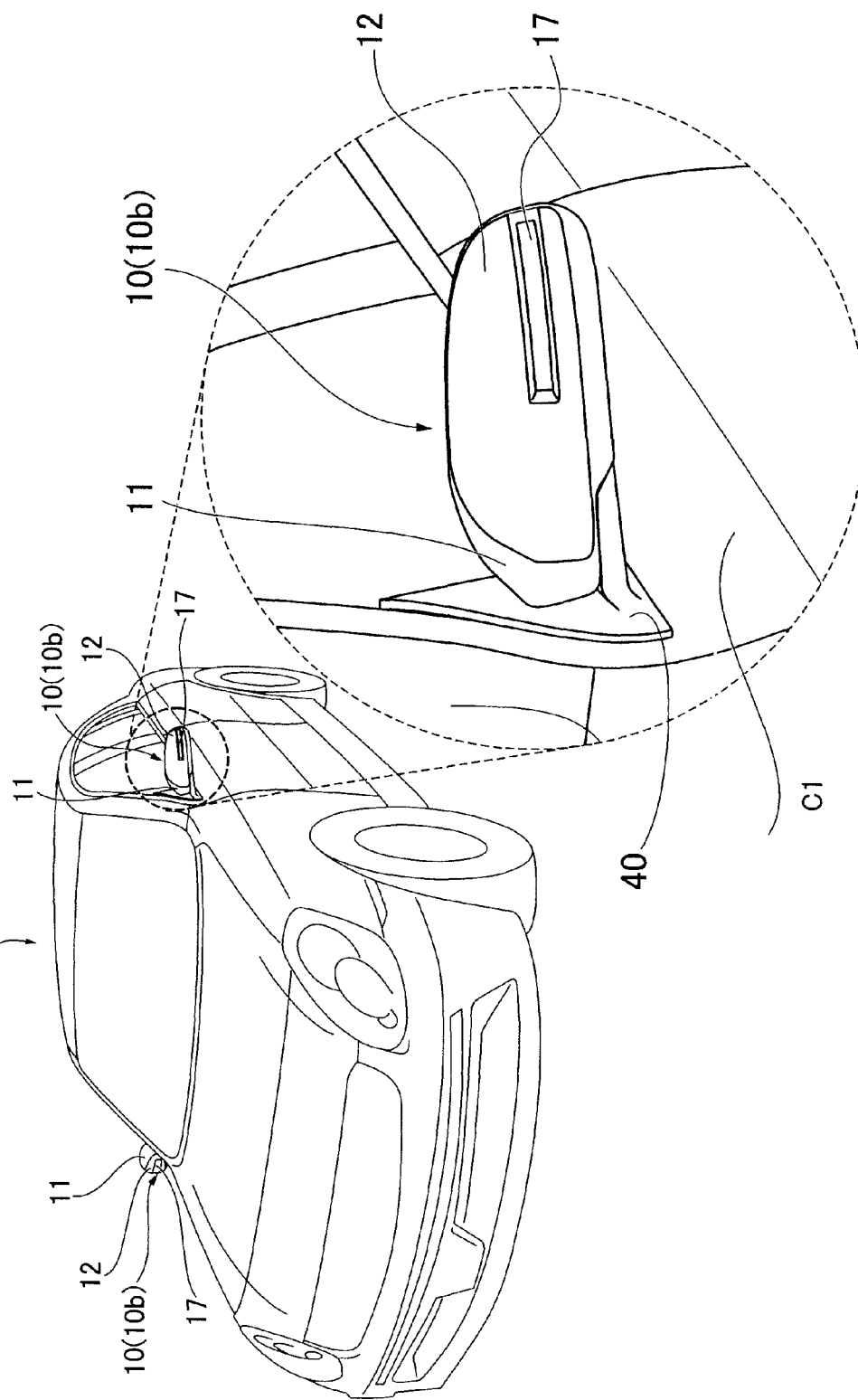
FIG. 1 is a schematic perspective view illustrating a vehicle on which vehicle side mirrors according to an embodiment of the present invention are mounted.

Reference will now be made in detail to the present preferred embodiments of the invention, examples of which are illustrated in the accompanying drawings. Wherever possible, the same reference numbers are used in the drawings and the description to refer to the same or like parts. The scope of the present invention, however, is not limited to these embodiments. Within the scope of the present invention, any structure and material described below can be appropriately modified.

As illustrated in FIG. 1, a vehicle side mirror 10 according to an embodiment of the present invention is mounted on each of both sides of a vehicle C to be used, for example, when an occupant, particularly, a driver checks behind the vehicle C.

Figure 2A:
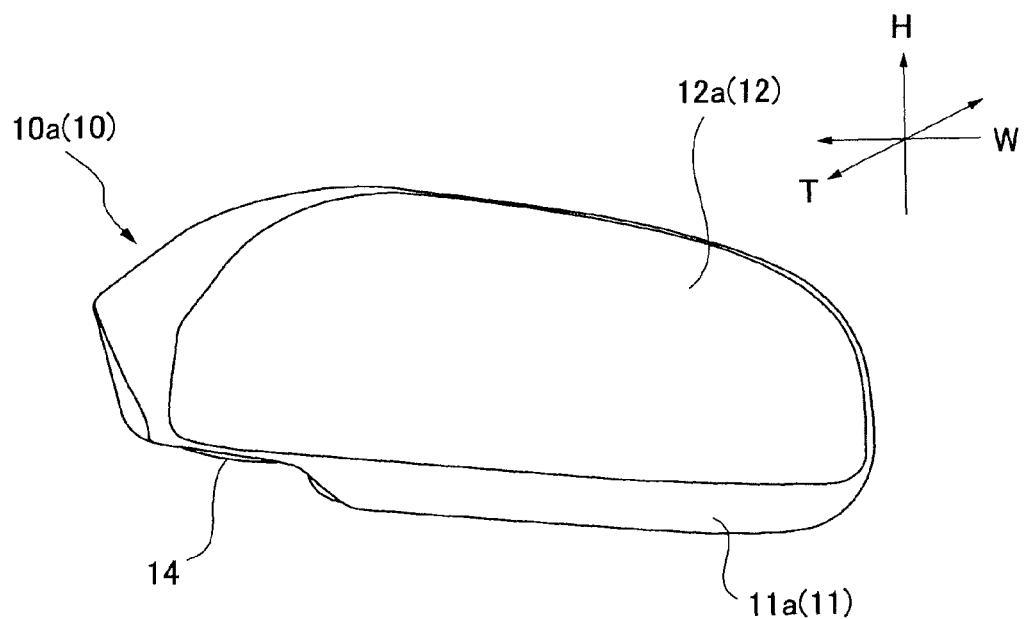
Figure 2B:
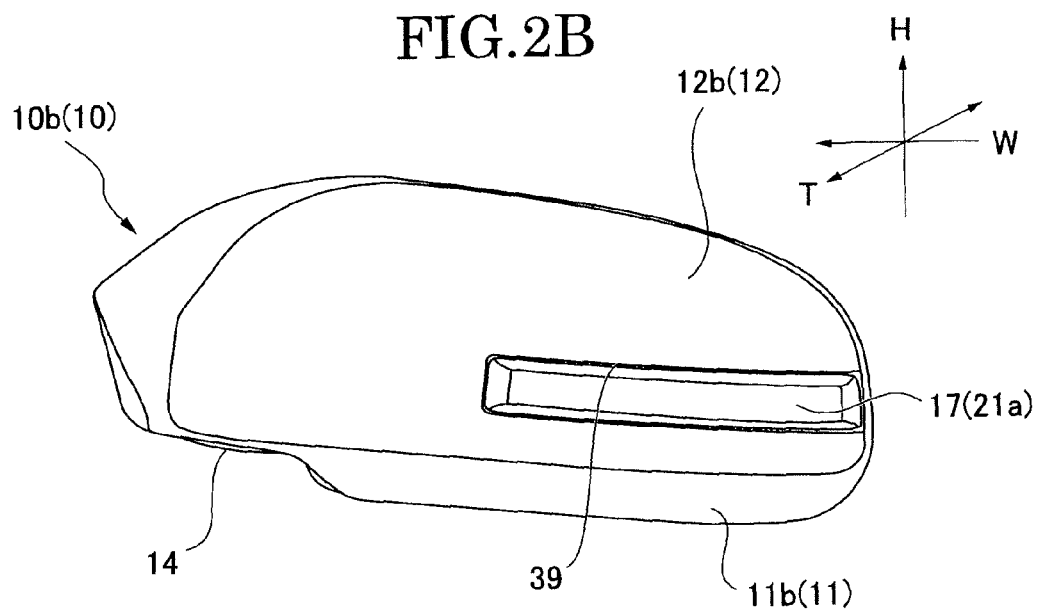
Figure 3:
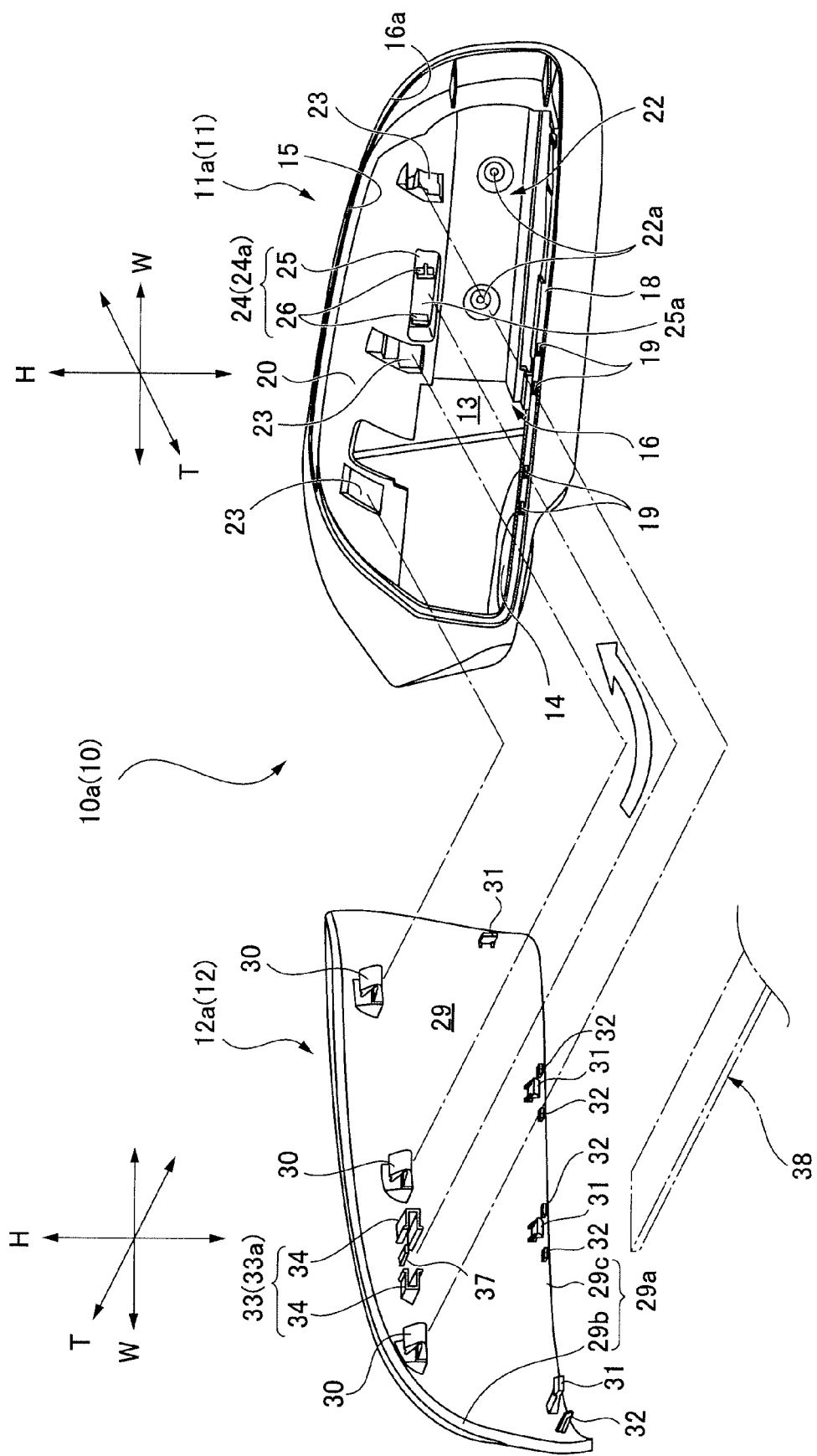
FIG. 3 is a schematic perspective view illustrating a first housing on right side and a first cover member on left side.

FIG. 1 illustrates a state that the vehicle side mirrors 10 according to the embodiment of the present invention are mounted on both sides of the vehicle C. FIGS. 2A and 2B each illustrates a different specification for the vehicle side mirror 10 of the present embodiment, wherein FIG. 2A illustrates a first vehicle side mirror 10a as a simple mirror, and FIG. 2B illustrates a second vehicle side mirror 10b having an auxiliary warning light 17. FIG. 3 illustrates a first housing 11a on right side and a first cover member 12a on left side, whereas FIG. 4 illustrates a second housing 11b on right side and a second cover member 12b on left side.

In the description given below, a height direction H of the vehicle side mirror 10, a thickness direction T (a direction perpendicular to the mirror) of the vehicle side mirror 10, and a width direction W (a direction extended from the vehicle C) of the vehicle side mirror 10 are used when the vehicle side mirrors 10 are mounted on the vehicle C (see FIG. 1). In addition, in the present embodiment, the vehicle side mirrors 10 mounted on both sides of the vehicle C have the same structure except that they are bilaterally-symmetrically formed. Therefore, only the vehicle side mirror 10 mounted on the left side from an occupant view-point will be described in the description given below and one mounted on the other side will not be described in detail. Additionally, FIG. 1 illustrates a state that the second vehicle side mirror 10b having the auxiliary warning light 17 is mounted on the vehicle C.

As illustrated in FIGS. 2A and 2B, the vehicle side mirror 10 is structured such that a cover member 12 is attached to each individually injection-molded housing 11 to form an integral outer shape and is rotatably supported by a base 40 attached to a vehicle panel C1, such as a front door of the vehicle C. Additionally, in the present embodiment, the vehicle side mirror 10 is supported by the base 40 attached to the vehicle panel C1 to thereby attach the housing 11 to the vehicle C. However, any structure may be employed in which the housing 11 instead of the cover member 12 is attached to the vehicle C directly or indirectly through a shaft or the like so the present invention is not limited to the aforementioned embodiment.

Under the condition that the vehicle side mirror 10 is in use (see FIG. 1), the housing 11 holds a mirror (not illustrated) to face to a rear side (rear side in the thickness direction T) in front-back direction of the vehicle C, and is container-shaped to form a storage space 13 (see FIG. 3 and FIG. 4) on a rear surface (front side in the front-back direction of the vehicle C) of the relevant mirror. The housing 11 has a mounted portion 14 (see FIG. 3 and FIG. 4) serving as a position where the base 40 attached to the vehicle C is mounted on. The housing 11 also has a mount opening 15 (see FIG. 3 and FIG. 4) on a surface (front side in the thickness direction T) at the back of a surface where the mirror (not illustrated) is held. The cover member 12 is attached to be fit into the mount opening 15. Accordingly, the surface where the mount opening 15 is formed is used as a housing-side facing surface 16 in the housing 11.

The cover member 12 is attachable to the housing 11 so as to cover the mount opening 15 (see FIG. 3 and FIG. 4). Once the cover member 12 is attached to the housing 11, it is structured to form an integral outer shape while forming the storage space 13 (see FIG. 3 and FIG. 4) inward in cooperation with the housing 11.

Plural specifications are provided for the vehicle side mirror 10, in which the entire outer shape is uniformed but its structure is partially different. In the present embodiment, there are provided: a first vehicle side mirror 10a (see FIG. 2A) of a specification having a simple mirror function; and a second vehicle side mirror 10b (see FIG. 2B) of a specification having the auxiliary warning light 17 such as a turn signal lamp. In these cases, the first housing 11a and the first cover member 12a are provided to be paired with each other in correspondence with the first vehicle side mirror 10a and the second housing 11b and the second cover member 12b are provided to be paired with each other in correspondence with the second vehicle side mirror 10b.

The first housing 11a corresponding to the first vehicle side mirror 10a is container-shaped to have a uniformed outer shape provided as the vehicle side mirror 10 and the mount opening 15 is formed on the housing-side facing surface 16 as illustrated in FIG. 3. An edge portion (housing-side facing-surface edge portion 16a) of the mount opening 15 is positioned on an outer surface of the vehicle side mirror 10 and a mount flange 18 is provided entirely on the inside circumference of the mount opening 15. The mount flange 18 is capable of bringing into surface contact with a peripheral edge portion of a below-mentioned cover-side facing surface 29 of the first cover member 12a. The mount flange 18 is also engageable with below-mentioned plural fastening claws 31 of the first cover member 12a. The mount flange 18 has plural positioning holes 19.

Moreover, the first housing 11a has an mount surface portion 20 formed with a curved surface so as to cover an upper half of the mount opening 15 while being continued to the mount flange 18. Below the mount surface part 20, there is provided an installation part 22, which is concaved on the side of the mount surface portion 20 (in other words, it is projected to the not-illustrated mirror side, not to the mount surface part 20 side, that is, the rear side in the thickness direction T) to install an auxiliary warning lighting tool 21 (see FIG. 4)

serving as the auxiliary warning light 17. The mount surface part 20 is capable of bringing into surface contact with an upper half of the cover-side facing surface 29 of the first cover member 12a and has three engagement holes 23 and a housing-side identification part 24 (the housing-side identification part provided in the first housing 11a is hereinafter referred to as a first housing-side identification part 24a).

The first housing-side identification part 24a has a pair of facing walls 26 on an identification concave part 25 formed on the mount surface part 20 which is a part of the housing-side facing surface 16. The identification concave part 25 is formed by partially concaving the mount surface part 20 in a box shape toward the rear side substantially in the thickness direction T and has a rectangular bottom surface 25a. As illustrated in FIG. 5, the pair of facing walls 26 is formed to face to each other with a predetermined distance in the width direction W. Each wall has: a plate-like part 27 that projects from the bottom surface 25a in an attachment direction of the first cover member 12a while facing each plane in the width direction W; and a rib part 28 that projects from the plate-like part 27 as being continued to the back surface side (an opposite side to a side where the plate-like parts 27 face to each other), and a cross-section perpendicular to the projecting direction has a T shape. Inside the identification concave part 25, in other words, on the bottom surface 25a, the pair of facing walls 26 is positioned to the closer side to the center of the vehicle C (mounted portion 14 side). The first cover member 12a is fit into the mount opening 15 (see FIG. 3).

The first cover member 12a has a plate-like shape entirely curved in a concave manner, and the concave surface serves as the cover-side facing surface 29 for an attachment side to the first housing 11a. The first cover member 12a is formed such that an edge portion of the cover-side facing surface 29 (cover-side facing-surface edge portion 29a) matches with the housing-side facing-surface edge portion 16a that forms the mount opening 15 of the first housing 11a. In the present embodiment, the cover-side facing-surface edge portion 29a is formed by: a curved side end surface 29b of a plate-like member, which is a part upwardly curved on the left side to the upper side of FIG. 3 in the front view; and a flat edge portion 29c of the plate-like member extended downward to the right side of FIG. 3 in the front view. The side end surface 29b is brought into surface contact with a portion extended upward from the right side of the mount flange 18 of the mount opening 15 of the first housing 11a, and the edge portion 29c is brought into surface contact with a portion extended downward from the left side of the mount flange 18 of the mount opening 15 of the first housing 11a.

Moreover, the cover-side facing surface 29 of the first cover member 12a comprises: three engagement pieces 30; four fastening claws 31; plural positioning pieces 32; and a cover-side identification part 33 (the cover-side identification part that is provided in the first housing 11a is hereinafter referred to as a first cover-side identification part 33a).

Each engagement piece 30 is engageable with each of three engagement holes 23 formed on the mount surface part 20 of the first housing 11a, and each fastening claw 31 is engageable with the mount flange 18 of the mount opening 15 of the first housing 11a. Moreover, each positioning piece 32 is insertable into each positioning hole 19 formed on the mount flange 18 of the mount opening 15 of the first housing 11a. Each positioning piece 32 is inserted into the corresponding positioning hole 19 to thereby position the first cover member 12a to the first housing 11a. Accordingly, when each positioning piece 32 is inserted into each positioning hole 19 to achieve relative positioning in a way that the cover-side facing surface 29 of the first cover member 12a brings into surface contact with the mount flange 18 and the mount surface part 20 of the first housing 11a, each engagement piece 30 is engaged with the corresponding engagement hole 23. Each fastening claw 31 is also engaged with the mount flange 18. As a result, the first cover member 12a is appropriately attached to the first housing 11a. The first cover-side identification part 33a is provided to identify whether or not the first cover member 12a corresponds to the first housing 11a.

Figure 7A:
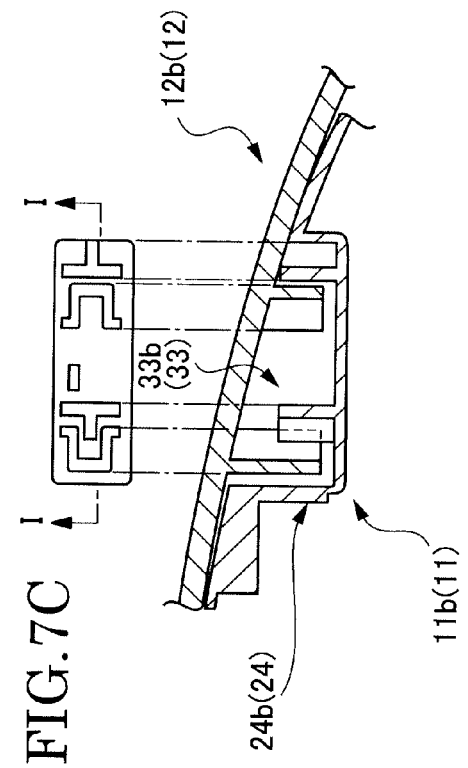

The first cover-side identification part 33a is provided on the cover-side facing surface 29 and is positioned to face to the first housing-side identification part 24a of the first housing 11a when the first cover member 12a is appropriately attached to the first housing 11a. In the present embodiment, the first cover-side identification part 33a has a pair of projecting walls 34 projecting from the cover-side facing surface 29 of the first cover member 12a. Both projecting walls 34 are arranged in parallel in the width direction W with a distance fitting to the pair of facing walls 26 facing to each other with a predetermined distance. Each projecting wall 34 has: a pair of relative parts 35 that projects from the cover-side facing surface 29 while facing to each other in the height direction H; and a connection part 36 that projects from the cover-side facing surface 29 while connecting each relative part 35 in the height direction H. A distance between positions where each projecting wall 34 is located is the largest in the width direction W and each projecting wall 34 has a U-shape to face each other in their cross sections perpendicular to the projection direction. Under the condition that the first cover member 12a is appropriately attached to the first housing 11a, the pair of projecting walls 34 of the first cover member 12a are provided to be positioned inside the identification concave part 25 of the first housing-side identification part 24a without interfering with the plate-like parts 27 of the pair of the facing walls 26 of the first housing-side identification part 24. Specifically, as illustrated in FIG. 7A, the pair of projecting walls 34 is provided such that the rib part 28 of a part of facing wall 26 is positioned between both relative parts 35 of a part (left side in the front view in FIG. 7A) of projecting walls 34. Concurrently the connection part 36 of the other projecting wall 34 and the plate-like part 27 of the other facing wall 26 are arranged. Both projecting walls 34 and the both facing walls 26 are also arranged in parallel alternately in the width direction W without being in contact with one another.

Moreover, as illustrated in FIG. 3, the pair of projecting walls 34, in cooperation with an auxiliary projection 37 formed therebetween, are capable of clamping a painting tool 38 for holding the first cover member 12a at the time of painting the first cover member 12a. As a result, the first cover member 12a is held, before being attached to the first housing 11a, by the painting tool 38, clamped by the pair of projecting walls 34, and then the first cover member 12a is painted.

Accordingly, in the case where the first cover member 12a is attached to the first housing 11a, the first housing-side identification part 24a and the first cover-side identification part 33a are provided to have a positional relationship such that they do not interfere with each other, and therefore the first cover member 12a is appropriately attached to the first housing 11a to thereby form the first vehicle side mirror 10a.

Now, the second housing 11b corresponding to the second vehicle side mirror 10b will be described. The structure of the second housing 11b is basically same as that of the first housing 11a, and the same reference numerals as those of the first housing 11a are used to the same functional parts as those of the first housing 11a, thus the specific description will not be provided in detail.

In the second housing 11b, the auxiliary warning light tool 21 is installed on the installation part 22 of the mount opening 15. The auxiliary warning light tool 21 has a lighting part 21a, which is put under flickering control to function as a turn signal lamp, and is attached to the installation part 22 by screwing a screw member, whose illustration is omitted, into a screw hole 22a (see FIG. 3) provided on the installation part 22. The auxiliary warning light tool 21 is provided with a connection terminal for making an electrical connection, whose illustration is omitted, to connect an electric component of the vehicle with a control part that performs total control when the second vehicle side mirror 10b is mounted on the vehicle C. The connection terminal is connected to a connection terminal through the control section of the vehicle C when the second vehicle side mirror 10b is mounted on the vehicle C.

Figure 7B:
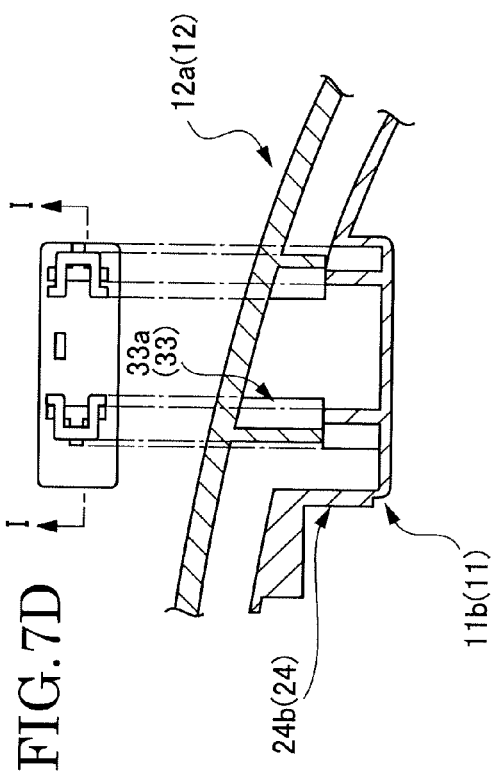
Figure 7C:
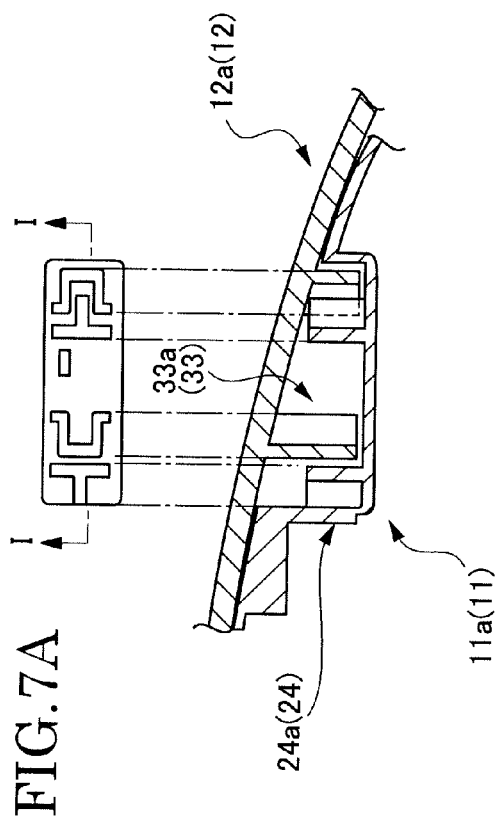
Figure 7D:
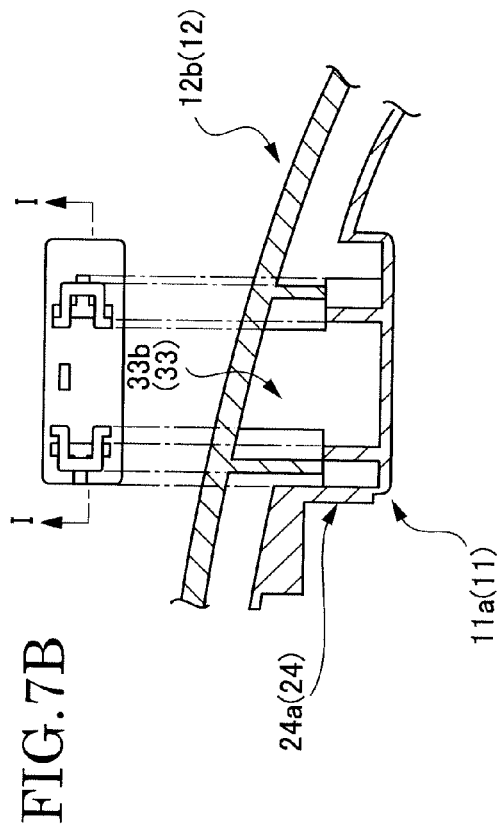

Moreover, the mount surface part 20 of the second housing 11b has a second housing-side identification part 24b which is different from the first housing-side identification part 24a of the first housing 11a. The second housing-side identification part 24b is provided with a pair of facing walls 26, which are substantially the same as the pair of facing walls 26 of the first housing-side identification part 24a, in the identification concave part 25 (on the bottom surface 25a), which is identical to the first housing-side identification part 24a, and at a position different from that of the first housing-side identification part 24a. Similar to the first housing-side identification part 24a, the pair of facing walls 26 of the second housing-side identification part 24b has a plate-like part 27 and a rib part 28, and the walls 26 and faces to each other with a predetermined distance in the width direction W. The pair of facing walls 26 of the second housing-side identification part 24b is positioned to the further side of the center of the vehicle C (right side in the front view in FIG. 4) in the identification concave part 25 (on the bottom surface 25a) in the width direction W. Specifically, the second housing-side identification part 24b has a structure in which the pair of facing walls 26 are positioned in the identification concave part 25 (on the bottom surface 25a) in such a way that a projected end of a pair of facing walls 26 of the second housing-side identification part 24b and a projected end of each of the pair of projecting walls 34 of the first cover-side identification part 33a abut so as to interfere with each other as illustrated in FIG. 7D in a case where the first cover member 12a of the first vehicle side mirror 10a is attempted to be attached to the second housing 11b. As a result, the second housing-side identification part 24b interferes with the first cover-side identification part 33a, and therefore the first cover member 12a is prevented from appropriately being attached to the second housing 11b. In other words, in cooperation with the second housing-side identification part 24b and the first cover-side identification part 33a, the erroneous attachment of the first cover member 12a to the second housing 11b is prevented, since the first cover member 12a is appropriately attachable if the second housing side identification part 24b is not provided. In this way, the first housing 11a and the second housing 11b have same structure but the structure of the housing-side identification part 24, if installation of the auxiliary warning lighting tool 21 is disregarded. In other words, the each position of the relevant pairs of the facing walls 26 in the identification concave part 25 (on the bottom surface 25a) differs in the first housing 11a and the second housing 11b by a distance d in the width direction W as illustrated in FIG. 5. The second housing 11b is structured to be paired with the second cover member 12b.

The structure of the second cover member 12b is basically same as that of the first cover member 12a, and the same reference numerals as those of the first cover member 12a are used to the same functional parts as those of the first cover member 12a, thus the specific description will not be provided in detail. The second cover member 12b has a cutout 39 capable of receiving the lighting part 21a of the auxiliary warning lighting tool 21.

Moreover, the cover-side facing surface 29 of the second cover member 12b has a second cover-side identification part 33b which is different from the first cover-side identification part 33a of the first cover member 12a. The second cover-side identification part 33b is provided with a pair of projecting walls 34, which is substantially the same as the pair of projecting walls 34 of the first cover member 12a, at a position different from that of the first cover member 12a. The pair of projecting walls 34 of the second cover-side identification part 33b is positioned on the vehicle C side in the width direction W. The projecting walls 34 of the second cover-side identification part 33b are closer to the center of the vehicle C side (right side in the front view in FIG. 4) than that of the first cover-side identification part 33a by a distance d (equivalent to the amount of shift of the housing-side identification part) as illustrated in FIG. 6. Specifically, in the case where the second cover member 12b is appropriately attached to the second housing 11b as illustrated in FIG. 7C, the pair of projecting walls 34 of the second cover-side identification part 33b are provided to be positioned inside the identification concave part 25 of the second housing-side identification part 24b without interfering with the plate-like parts 27 of the pair of the facing walls 26 of the second housing-side identification parts 24b. In addition, the second cover-side identification part 33b has a structure in which the pair of projecting walls 34 of the second cover-side identification part 33b are positioned on the cover-side facing surface 29 in such a way that when the second cover member 12b is attempted to be attached to the first housing 11a corresponding to the first vehicle side mirror 10a, a projected end of each of the pair of projecting walls 34 of the second cover-side identification part 33b and a projected end of each of the pair of facing walls 26 of the first housing-side identification part 24a abut on each other to cause interference as illustrated in FIG. 7B. In this way, the first cover member 12a and the second cover member 12b have the same structure but the structure of the cover-side identification part 33 if the installation of the cutout 39 is disregarded. In other words, each position of the relevant pairs of the projecting walls 34 on the cover-side facing surface 29 differs in the first cover member 12a and the second cover member 12b by a distance d in the width direction W as illustrated in FIG. 6.

Accordingly, in the case where the second cover member 12b is attempted to be attached to the second housing 11b, the second cover-side identification part 33b does not interfere with the second housing-side identification part 24b, therefore the second cover member 12b is possible to be appropriately attached to the second housing 11b. As a result, the lighting part 21a of the auxiliary warning lighting tool 21, which is installed in the installation part 22 of the mount opening 15 of the second housing 11b, is exposed from the cutout 39 of the second cover member 12b to form the second vehicle side mirror 10b having the auxiliary warning light 17 (see FIG. 2B).

Moreover, since the second cover-side identification part 33b interferes with the first housing-side identification part 24a, the second cover member 12b is prevented from being attached appropriately to the first housing 11a. In other words, in cooperation with the second cover-side identification part 33b and the first housing-side identification part 24a, the erroneous attachment of the second cover member 12b to the first housing 11a is prevented, since the second cover member 12b is appropriately attachable if the second cover-side identification part 33b is not provided.

As described above, the first housing-side identification part 24a, the second housing-side identification part 24b, the first cover-side identification part 33a and the second cover-side identification part 33b, that is, the first housing 11a, the second housing 11b, the first cover member 12a and the second cover member 12 have the following correlation as illustrated in FIGS. 7A to 7D. FIGS. 7A to 7D are explanatory views each in which, under a so-called appropriate condition that the housing-side facing-surface edge portion 16a and the cover-side facing-surface edge portion 29a are brought into contact with each other, while coinciding with each other, when the housing 11 (11a, 11b) attempts to attach to the cover member 12 (12a, 12b), a positional relationship between the housing-side identification part 24 and the cover-side identification part 33 from a view-point in the attaching direction is illustrated in an upper portion of the figure and a schematic cross-sectional view taken along a line I-I illustrated therein is illustrated in a lower portion thereof. FIG. 7A illustrates the first housing 11a and the first cover member 12a, FIG. 7B illustrates the first housing 11a and the second cover member 12b, FIG. 7C illustrates the second housing 11b and the second cover member 12b, and FIG. 7D illustrates the second housing 11b and the first cover member 12a, respectively.

The first housing-side identification part 24a does not interfere with the first cover-side identification part 33a (see FIG. 7A), but interferes with the second cover-side identification 33b (see FIG. 7B). Accordingly, the first cover member 12a is possible to be appropriately attached to the first housing 11a, but the second cover member 12b cannot be appropriately attached thereto.

The second housing-side identification part 24b does not interfere with the second cover-side identification part 33b (see FIG. 7C), but interferes with the first cover-side identification 33a (see FIG. 7D). Accordingly, the second cover member 12b is possible to be appropriately attached to the second housing 11b, but the first cover member 12a cannot be appropriately attached thereto.

The first cover-side identification part 33a does not interfere with first housing-side identification part 24a (see FIG. 7A), but interferes with the second housing-side identification part 24b (see FIG. 7D). Accordingly, the first cover member 12a is possible to be appropriately attached to the first housing 11a, but cannot be appropriately attached to the second housing 11b.

The second cover-side identification part 33b does not interfere with the second housing-side identification part 24b (see FIG. 7C), but interferes with the first housing-side identification part 24a (see FIG. 7B). Accordingly, the second cover member 12b is possible to be appropriately attached to the second housing 11b, but cannot be appropriately attached to the first housing 11a.

As mentioned above, the housing-side identification part 24 and the cover-side identification part 33 identify whether or not it is possible to attach the cover member 12 to the housing 11 in cooperation with each other, thereby identifying whether or not the housing 11 and the cover member 12 are paired with each other.

As described above, in the vehicle side mirror 10 according to the embodiment of the present invention, there are provided the specification having only the mirror function (first vehicle side mirror 10a), and the specification having the auxiliary warning light 17 such as a turn signal lamp (second vehicle side mirror 10b). The first cover member 12a, which is paired with the first housing 11a corresponding to the first vehicle side mirror 10a, is possible to be appropriately attached to the first housing 11a, but the second cover member 12b, which is not paired with the first housing 11a (and which corresponds to the second vehicle side 10b), cannot be appropriately attached thereto. Accordingly, erroneously attachment of the second cover member 12b to the first housing 11a is prevented. Therefore the first cover member 12a, which is the appropriate pair of the first housing 11a, is possible to be attached to the first housing 11a, thereby making it possible to form the first vehicle side mirror 10a of the specification having only the simple mirror function.

Moreover, in the vehicle side mirror 10 according to the embodiment of the present invention, the second cover member 12b, which is paired with the second housing 11b corresponding to the second vehicle side mirror 10b, is possible to be appropriately attached to the second housing 11b, but the first cover member 12a, which is not paired with the second housing 11b (and which corresponds to the first vehicle side 10a), cannot be appropriately attached thereto. Accordingly, erroneous attachment of the first cover member 12a to the second housing 11b is prevented, and the second cover member 12b, which is the appropriate pair of the second housing 11b, is possible to be attached to the second housing 11b, thereby making it possible to form the second vehicle side mirror 10b of the specification having the auxiliary warning light 17.

Furthermore, in the vehicle side mirror 10 according to the embodiment of the present invention, the housing 11 (11a, 11b) is provided for each different specification. The housings 11a and 11b have the same structure but the position where the pair of the facing walls 26 of the housing-side identification part 24 are located, and therefore they are formable by injection molding using the same mold, whose illustration is omitted, in which only an insert for forming the pair of facing walls 26 is changed. In other words, if only the position of the pair of facing walls 26 is suitably provided, the attachment of the cover member 12 of a specification different from a desired specification is surely prevented while allowing the attachment of the cover member 12 of a desired specification.

In the vehicle side mirror 10 according to the embodiment of the present invention, the cover member 12 (12a, 12b) is provided for each different specification. The cover members 12a and 12b have the same structure but the position where the pair of the projecting walls 34 of the cover-side identification part 33 are located, and therefore they are formable by injection molding using the same mold, whose illustration is omitted, in which only an insert for forming the pair of projecting walls 34 is changed. In other words, if only the position of the pair of projecting walls 34 is suitably provided, the attachment of the cover member 12 from to the housing 11 of a specification different from a desired specification is surely prevented, while allowing the attachment of the cover member 12 of a desired specification.

In the vehicle side mirror 10 according to the embodiment of the present invention, the projected end of the projected portions of the housing-side identification part 24 and the projected end of the projected portions of the cover-side identification part 33 (the projected end of the pair of facing walls 26 and the projected end of the pair of projecting walls 34) abut on each other, thereby preventing the cover member 12 from being appropriately attached to the housing 11. In this way, it is possible to surely prevent the cover member 12 from being appropriately attached to the housing 11 with a simple structure.

In the vehicle side mirror 10 according to the embodiment of the present invention, the projected end of the pair of facing walls 26 of the housing-side identification part 24 and the projected end of the pair of projecting walls 34 of the cover-side identification part 33 abut on to interfere with each other, thereby preventing the cover member 12, which is not paired with the corresponding housing 11 (in other words, a combination different from the desired specification), from being appropriately attached to the housing 11. Therefore, as compared with the case in which only each single projected portion abuts on each other, it is possible to ensure interference by the abutment as well as to improve stability in this abutment state. Particularly, in the aforementioned embodiment, in a view of a cross section perpendicular to the attachment direction where the cover member 12 is attached to the housing 11, the pair of relative parts 35 extending in the width direction W of the pair of projecting walls 34 of the cover-side identification part 33 abut on the plate-like part 27 extending in the height direction H of the pair of facing walls 26 of the housing-side identification part 24. Concurrently, the connection part 36 extending in the height direction H of the pair of projecting walls 34 of the cover-side identification part 33 abuts on the rib part 28 extending in the width direction W of the pair of facing walls 26 of the housing-side identification part 24. Therefore, it is possible to ensure interference by the abutment as well as to improve stability in this abutment state. Accordingly, it is possible to further ensure the prevention of forming the vehicle side mirror having a combination of the housing and the cover member which is different from a desired specification.

In the vehicle side mirror 10 according to the embodiment of the present invention, the cover-side identification part 33, which identifies whether or not the housing 11 and the cover member 12 are paired with each other, is possible to function as an attaching position to the painting tool 38 for holding the cover member 12 when the cover member 12 is painted.

Therefore, the vehicle side mirror 10 according to the embodiment of the present invention forms the uniformed outer shape by the housing 11 and the cover member 12 attached thereto while having the plurality of specifications and is also capable of preventing a erroneous formation having the specification (combination) different from the desired specification from being formed.

Additionally, in the aforementioned embodiment, the difference in specification lies in the presence or absence of the auxiliary warning light 17. However, as far as forming the uniformed outer shape, the difference in content of specification is not limited to the aforementioned embodiment. For example, the difference in specification is possible to be set when a uniformed basic color is used for the housing and only the cover member is made to be matched with a vehicle color. In this case, there is prepared plural types of cover members whose difference lies in only the color. In the operation for attaching the relevant cover members, there is no difference in process such as the presence or absence of wiring for the auxiliary warning lighting tool 21 as in the case of the presence or absence of the auxiliary warning light 17. This makes the embodiment of the present invention more effective in the point that an erroneous formation of the specification (combination) different from the desired specification is prevented. In addition, the difference in specification may be, for example, the presence or absence of a camera for checking behind the vehicle C.

Moreover, in the aforementioned embodiment, the housing-side identification part 24 is structured such that the pair of facing walls 26 is provided on the identification concave part 25 of the housing-side facing surface 16 and the cover-side identification part 33 is structured such that the pair of projecting walls 34 is provided on the cover-side facing surface 29. However, the present invention is not limited to the aforementioned embodiment, and any structure may be possible if appropriate attachment of the housing 11 and the cover member 12, which are paired with each other, is allowed and appropriate attachment of the housing 11 and the cover member 12, which are not paired with each other, is prevented.

Furthermore, the aforementioned embodiment has illustrated the example using two specifications. However, the present invention is not limited to the aforementioned embodiment, and any structure may be possible if a housing-side identification part of each housing and a cover-side identification part of each cover member are suitably provided such that a pair of housing and cover member are prepared for each vehicle side mirror having a different specification, each housing allows appropriate attachment of only the cover member which is paired, among the cover members of all types, and each cover member allows appropriate attachment of only the housing, which is paired, among the housings of all types.

In the above embodiment, the vehicle side mirror is structured to be bilaterally-symmetric to the right and left sides of the vehicle C. However, the present invention is not limited to the aforementioned embodiment, and any structure may be possible if the each vehicle side mirror on the right and left sides respectively forms the uniformed outer shape. For example, a specification may be used where a camera is provided on only one side.

Accordingly, it is possible to extract the following (1) to (6) from the above-described exemplary embodiments of the present invention.

(1) A vehicle side mirror, comprising: a housing attached to a vehicle and holding a mirror; and a cover member being attachable to the housing, the cover member and the housing forming an integral outer shape of the vehicle side mirror when the cover member is appropriately attached to the housing, wherein the cover member includes a cover-side identification part, and wherein the housing includes a housing-side identification part which allows the cover member being paired with the housing to be appropriately attached to the housing, and which prevents the cover member not being paired with the housing from being appropriately attached to the housing, in cooperation with the cover-side identification part.

Therefore, it is possible to provide a vehicle side mirror forming an outer shape which is uniformed by a housing and a cover member attached thereto while having plural specifications and being capable of preventing an erroneous formation having a specification (combination) different from a desired specification.

Specifically, the vehicle side mirror according to the embodiment of the present invention makes it possible to surely prevent erroneously forming a vehicle side mirror having a specification (combination) different from a desired specification, regardless of a variation in content of specification, by making a pair of the housing and the cover member per each specification, so that only the cover member which is paired with the corresponding housing is attachable.

(2) The vehicle side mirror according to (1), wherein a housing-side facing-surface edge portion of a housing-side facing surface, on a side to which the cover member is attached, of the housing and a cover-side facing-surface edge portion of a cover-side facing surface, on a side which is attached to the housing, of the cover member are shaped to be matched with each other, and when the cover member is attached to the housing in such a manner that the housing-side facing-surface edge portion and the cover-side facing-surface edge portion are brought into contact with each other while coinciding with each other, the integral outer shape is formed by the housing and the cover member.

Therefore, it possible to surely prevent erroneously forming a vehicle side mirror having a specification (combination) different from a desired specification, regardless of a variation in content of specification, by making a pair of the housing and the cover member per each specification, so that only the cover member which is paired with the corresponding housing is attachable.

(3) The vehicle side mirror according to (1) or (2), wherein the housing-side identification part is formed on the housing-side facing surface, the cover-side identification part is formed on the cover-side facing surface and at a position facing to the housing-side identification part when the cover member is appropriately attached to the housing, and when the cover member, not being paired with the housing provided with the housing-side identification part, is attempted to be attached to the housing, the housing-side identification part interferes with the cover-side identification part of the cover member to prevent the cover member from being appropriately attached to the housing, and when the cover member, being paired with the housing provided with the housing-side identification part, is attempted to be attached to the housing, the housing-side identification part allows the cover member to be attached to the housing without interfering with the cover-side identification part of the cover member.

In addition to the above structure, the housing-side identification part is formed on the housing-side facing surface and the cover-side identification part is formed, on the cover-side facing surface, and at a position facing the housing-side identification part when the cover member is appropriately attached to the housing. The housing-side identification part blocks appropriate attachment of the cover member to the housing, by being interfered with the cover-side identification part of the cover member, in a case where a cover member not being paired with the housing on which the housing-side identification part is provided, is attempted to be attached to the housing. When the cover member, being paired with the housing provided with the housing-side identification part, is attempted to be attached to the housing, the housing-side identification part allows attachment of the cover member to the housing without interfering with the cover-side identification part of the cover member. As a result, appropriate attachment of the cover member to the housing is achieved by suitably providing a relative positional relationship between the housing-side identification part and the cover-side identification part that are facing each other.

(4) The vehicle side mirror according to (3), wherein the cover-side identification part has a projection portion that projects from the cover-side facing surface in an attachment direction to the housing, the housing-side identification part has a projection portion that projects from the housing-side facing surface in an attachment direction to the cover member, and the cover-side identification part and the housing-side identification part interfere with each other when projected ends of the respective projection portions thereof abut on each other, and do not interfere with each other when the projection portions thereof are positioned in parallel to each other, so that abutment of the projected ends thereof is avoided.

In addition to the above structure, the cover-side identification part has a projection portion that projects from the cover-side facing surface in an attachment direction to the housing, the housing-side identification part has a projection part that projects from the housing-side facing surface in an attachment direction to the cover member. The cover-side identification part and the housing-side identification part interfere with each other when each projected end of the each projection portion abuts on each other, and do not interfere with each other when each projection portion is disposed in parallel to each other while abutment of each projected end is avoided. As a result, the housing-side identification part and the cover-side identification part are formed by providing the projection portions on both the housing and the cover member based on the adjusted positional relationship therebetween, respectively.

(5) The vehicle side mirror according to (4), wherein the projection portion of the housing-side identification part is formed by a pair of facing walls that project from the housing-side facing surface while facing each other with a predetermined distance in between, and the projection portion of the cover-side identification part is formed by a pair of projecting walls that project from the cover-side facing surface while being arranged with a distance in between fitting to the facing walls.

In addition to the above structure, the projection portion of the housing-side identification part is formed by a pair of facing walls that project from the housing-side facing surface while facing with a predetermined distance. The projection portion of the cover-side identification part is formed by a pair of projecting walls that project from the cover-side facing surface while being arranged with a distance fitting to each facing wall. This makes it possible to ensure interference due to abutment of the housing-side identification part on the cover-side identification part as well as to improve stability in this abutment state. In this way, it is possible to further ensure preventing erroneous formation of the vehicle side mirror having a combination of the housing and the cover member, which is different from the desired specification.

(6) The vehicle side mirror according to (5), wherein the pair of the projecting walls of the cover-side identification part are capable of clamping a painting tool for painting the cover member.

In addition to the above structure, the pair of the projecting walls of the cover-side identification part is capable of clamping a paining tool for paining the cover member. This makes it possible to use the cover-side identification part as a holding part for holding the painting tool.

Although the present invention has been described in terms of exemplary embodiments, it is not limited thereto. It should be appreciated that variations may be made in the embodiments described by persons skilled in the art without departing from the scope of the present invention as defined by the following claims. The limitations in the claims are to be interpreted broadly based on the language employed in the claims and not limited to examples described in the present specification or during the prosecution of the application, and the examples are to be construed as non-exclusive. For example, in the present disclosure, the term "preferably", "preferred" or the like is non-exclusive and means "preferably", but not limited to. The use of the terms first, second, etc. do not denote any order or importance, but rather the terms first, second, etc. are used to distinguish one element from another. Moreover, no element or component in the present disclosure is intended to be dedicated to the public regardless of whether the element or component is explicitly recited in the following claims.

What is claimed is:

1. A vehicle side mirror, comprising:
 a housing of a first specification attached to a vehicle and holding a mirror; and
 a cover member of the first specification being attachable to the housing of the first specification, the cover member of the first specification and the housing of the first specification forming an integral outer shape of the vehicle side minor when the cover member of the first specification is appropriately attached to the housing of the first specification, wherein
in order to prevent wrong attachment of the housing of the first specification and the cover member of the first specification to a housing and a cover member of a second specification different from the first specification,
the cover member of the first specification includes a cover-side identification part, and
the housing of the first specification includes a housing-side identification part which allows the cover member of the first specification being paired with the housing of the first specification to be appropriately attached to the housing of the first specification, and which prevents the cover member of the second specification not being paired with the housing of the first specification from being appropriately attached to the housing of the first specification, in cooperation with the cover-side identification part of the first specification.

2. The vehicle side mirror according to claim 1, wherein a housing-side facing-surface edge portion of a housing-side facing surface, on a side to which the cover member of the first specification is attached, of the housing of the first specification and a cover-side facing-surface edge portion of a cover-side facing surface, on a side which is attached to the housing of the first specification, of the cover member of the first specification are shaped to be matched with each other, and
when the cover member of the first specification is attached to the housing of the first specification in such a manner that the housing-side facing-surface edge portion and the cover-side facing-surface edge portion are brought into contact with each other while coinciding with each other, the integral outer shape is formed by the housing of the first specification and the cover member of the first specification.

3. The vehicle side mirror according to claim 1, wherein
the housing-side identification part is formed on the housing-side facing surface,
the cover-side identification part is formed on the cover-side facing surface and at a position facing the housing-side identification part when the cover member of the first specification is appropriately attached to the housing of the first specification,
when the cover member of the second specification, not being paired with the housing of the first specification provided with the housing-side identification part, is attempted to be attached to the housing of the first specification, the housing-side identification part interferes with the cover-side identification part of the cover member of the second specification to prevent the cover member of the second specification from being appropriately attached to the housing of the first specification, and
when the cover member of the first specification, being paired with the housing of the first specification provided with the housing-side identification part, is attempted to be attached to the housing of the first specification, the housing-side identification part allows the cover member of the first specification to be attached to the housing of the first specification without interfering with the cover-side identification part of the cover member of the first specification.

4. The vehicle side mirror according to claim 3, wherein
the cover-side identification part has a projection portion that projects from the cover-side facing surface in an attachment direction to the housing of the first specification,
the housing-side identification part has a projection portion that projects from the housing-side facing surface in an attachment direction to the cover member of the first specification, and
the cover-side identification part and the housing-side identification part interfere with each other when projected ends of the respective projection portions thereof abut on each other, and do not interfere with each other when the projection portions thereof are positioned in parallel to each other, so that abutment of the projected ends thereof is avoided.

5. The vehicle side mirror according to claim 4, wherein
the projection portion of the housing-side identification part is formed by a pair of facing walls that project from the housing-side facing surface while facing each other with a predetermined distance in between, and
the projection portion of the cover-side identification part is formed by a pair of projecting walls that project from the cover-side facing surface while being arranged with a distance in between fitting to the facing walls.

6. The vehicle side mirror according to claim 5, wherein the pair of the projecting walls of the cover-side identification part are capable of clamping a painting tool for painting the cover member of the first specification.

7. The vehicle side mirror according to claim 2, wherein
the housing-side identification part is formed on the housing-side facing surface,
the cover-side identification part is formed on the cover-side facing surface and at a position facing to the housing-side identification part when the cover member of the first specification is appropriately attached to the housing of the first specification, and
when the cover member of the second specification, not being paired with the housing of the first specification provided with the housing-side identification part, is attempted to be attached to the housing of the first specification, the housing-side identification part interferes with the cover-side identification part of the cover member of the second specification to prevent the cover member of the second specification from being appropriately attached to the housing of the first specification, and
when the cover member of the first specification, being paired with the housing of the first specification provided with the housing-side identification part, is attempted to be attached to the housing of the first specification, the housing-side identification part allows the cover member of the first specification to be attached to the housing of the first specification without interfering with the cover-side identification part of the cover member of the first specification.

8. The vehicle side mirror according to claim 7, wherein
the cover-side identification part has a projection portion that projects from the cover-side facing surface in an attachment direction to the housing of the first specification,
the housing-side identification part has a projection portion that projects from the housing-side facing surface in an attachment direction to the cover member of the first specification, and
the cover-side identification part and the housing-side identification part interfere with each other when projected ends of the respective projection portions thereof abut on each other, and do not interfere with each other when the projection portions thereof are positioned in parallel to each other, so that abutment of the projected ends thereof is avoided.

9. The vehicle side mirror according to claim 8, wherein the projection portion of the housing-side identification part is formed by a pair of facing walls that project from the housing-side facing surface while facing each other with a predetermined distance in between, and the projection portion of the cover-side identification part is formed by a pair of projecting walls that project from the cover-side facing surface while being arranged with a distance in between fitting to the facing walls.

10. The vehicle side mirror according to claim 9, wherein the pair of the projecting walls of the cover-side identification part are capable of clamping a painting tool for painting the cover member.

* * * * *